(12) United States Patent
Yasuda

(10) Patent No.: US 6,492,655 B2
(45) Date of Patent: Dec. 10, 2002

(54) METHOD AND APPARATUS FOR READING IMAGE INFORMATION

(75) Inventor: Hiroaki Yasuda, Kaisei-machi (JP)

(73) Assignee: Fuji Photo Film Co., Ltd., Kanagawa-Ken (JP)

(*) Notice: Subject to any disclaimer, the term of this patent is extended or adjusted under 35 U.S.C. 154(b) by 51 days.

(21) Appl. No.: 09/826,309

(22) Filed: Apr. 5, 2001

(65) Prior Publication Data

US 2001/0045535 A1 Nov. 29, 2001

(30) Foreign Application Priority Data

Apr. 5, 2000 (JP) ........................ 2000-103411

(51) Int. Cl.[7] .................. G03B 42/08; G03B 42/02
(52) U.S. Cl. .................. 250/587; 250/581; 250/585
(58) Field of Search .................. 250/587, 585, 250/586, 584

(56) References Cited

U.S. PATENT DOCUMENTS

| | | | | |
|---|---|---|---|---|
| 4,272,477 A | | 6/1981 | Hagedorn | 422/50 |
| 4,816,679 A | | 3/1989 | Sunagawa et al. | 250/27.2 |
| 4,916,316 A | * | 4/1990 | Umemoto et al. | 250/587 |
| 4,922,103 A | | 5/1990 | Kawajiri et al. | 250/327.2 |
| 4,952,807 A | * | 8/1990 | Adachi | 250/587 |
| 5,028,782 A | * | 7/1991 | Nakajima | 250/587 |
| 5,055,682 A | * | 10/1991 | Takeo | 250/587 |
| 5,086,228 A | * | 2/1992 | Kojima | 250/587 |
| 5,151,597 A | * | 9/1992 | Agano | 250/587 |
| 5,260,561 A | * | 11/1993 | Dhurjaty | 250/205 |
| 5,633,511 A | * | 5/1997 | Lee et al. | 250/587 |
| 5,832,055 A | * | 11/1998 | Dewaele | 250/587 |
| 5,981,968 A | * | 11/1999 | Nakazawa | 250/587 |
| 6,316,783 B1 | * | 11/2001 | Tsuto | 174/255 |
| 2001/0020690 A1 | * | 9/2001 | Yasuda et al. | 250/586 |
| 2002/0053649 A1 | * | 5/2002 | Yasuda | 216/89 |

FOREIGN PATENT DOCUMENTS

| | | | |
|---|---|---|---|
| JP | 55-12492 | 1/1980 | G01N/1/00 |
| JP | 56-11395 | 2/1981 | G12K/4/00 |
| JP | 58-121874 | 7/1983 | H04N/5/32 |
| JP | 60-111568 | 6/1985 | H04N/1/04 |
| JP | 60-236354 | 11/1985 | H04N/1/04 |
| JP | 7-76800 | 3/1995 | C25F/7/00 |

OTHER PUBLICATIONS

English Abstract of JP 56–11395, Feb. 4, 1981.
English Abstract of JP 58–121874, Jul. 20, 1983.
English Abstract of JP 7–76800, Mar. 20, 1995.
"Radiographic Process Utilizing a Photoconductive solid–State Imager" 772/Research Disclosure, Oct. 1992.

* cited by examiner

Primary Examiner—Constantine Hannaher
Assistant Examiner—Albert Gagliardi
(74) Attorney, Agent, or Firm—Sughrue Mion, PLLC

(57) ABSTRACT

Disclosed herein is a method of obtaining an image signal, comprising the steps of preparing an image recording sheet having a stimulable phosphor layer which emits photostimulated luminescent light in a quantity corresponding to stored energy when irradiated with stimulating light, scanning the image recording sheet in horizontal and vertical scanning directions with the stimulating light, and obtaining the image signal by detecting the photostimulated luminescent light emitted by the scanning, with a solid-state image detector having a photoconductor. The signal, output from the solid-state image detector when scanning a non-image region other than an image recording region on the image recording sheet with the stimulating light, is detected as a correction signal. A non-image component, contained in a signal output from the solid-state image detector when scanning the image recording region with the stimulating light, is suppressed with the correction signal.

20 Claims, 8 Drawing Sheets

METHOD AND APPARATUS FOR READING IMAGE INFORMATION

BACKGROUND OF THE INVENTION

1. Field of the Invention

The present invention relates to a method of and an apparatus for reading out image information, by scanning an image recording sheet having a stimulable phosphor layer with stimulating light, and detecting photostimulated luminescent light emitted from the sheet with an image detector that has a semiconductor as its primary portion.

2. Description of the Related Art

It is well known in the image reading field to utilize a stimulable phosphor sheet to obtain image information. The stimulable phosphor stores part of radiation energy when exposed to radiation, and exhibits photostimulated luminescence (PSL) according to the stored energy when exposed to stimulating light, such as visible light, etc. The radiation image information of a subject, such as a human body, etc., is temporarily recorded on the stimulable phosphor sheet having a stimulable phosphor layer. The stimulable phosphor sheet emits photostimulated luminescent light when scanned with a stimulating light beam such as a laser light beam. The photostimulated luminescent light is detected photoelectrically and converted to an image signal carrying the radiation image information. As the image information reading apparatus, there have been proposed a wide variety of apparatuses that vary in manner of scanning a stimulating light beam and converting photostimulated luminescent light to an image signal.

For example, as disclosed in Japanese Unexamined Patent Publication Nos. 55(1980)-12492 and 56(1981)-11395, a photomultiplier has been widely employed as a photoelectric converter, which detects photostimulated luminescent light emitted from a stimulable phosphor sheet when scanned with a stimulating light beam. The photomultiplier, however, has the following problems:

1) The photomultiplier is low in shock resistance, large in size, and high in cost, because it is constructed of a hollow glass tube.
2) The photomultiplier is fairly difficult to make thin, as it uses a complex multistage dynode to double photons. The cost of manufacturing a long photomultiplier 17 inches in width would become unduly high.
3) The quantum efficiency of the photocathode utilizing an external photoelectric effect is low. The quantum efficiency with respect to photostimulated luminescent light of wavelength 300 to 500 nm (blue light band) is typically as low as about 10 to 20%, whereas the quantum efficiency with respect to photostimulated luminescent light of wavelength 600 to 700 nm (red light band) is relatively great, typically about 0.1 to 2%. For this reason, a special stimulating-light cut filter becomes necessary to obtain a satisfactory signal-to-noise ratio (S/N ratio) and results in an increase in the manufacturing cost.

Hence, in order to solve the problems associated with the photomultiplier, Japanese Unexamined Patent Publication Nos. 58(1983)-121874, 60(1985)-111568, 60(1985)-236354, "Radiographic Process Utilizing a Photoconductive Solid-State Imager (772/Research disclosure, Oct. 1992/34264)," and Japanese Unexamined Patent Publication No. 7(1995)-76800, disclose that a semiconductor sensor (hereinafter referred to as a solid-state image detector) is used instead of the photomultiplier. The solid-state image detector employs a semiconductor (such as ZnS, ZnSe, CdS, TiO2, ZnO, $\alpha$-SiH, CdS(Cu), ZnS(Al), CdSe, PbO, $\alpha$-Se, etc.) as a photoconductor.

The solid-state image detectors consisting of the above-mentioned semiconductors, however, have the following problems: photostimulated luminescent light is feeble, so a photoconductor to be used is required to have extremely high dark resistance, but the disclosed photoconductors are all low in dark resistance; and since image reading is performed under a relatively strong electric field, the dark current increases and is superposed on the current component carrying an image signal and develops as dark latent image noise in a reproduced image. Particularly, $\alpha$-SiH, CdS(Cu), ZnS(Al), CdSe, and PbO, whose bandgap is small, have a large dark current resulting from thermal excitation, so it is extremely difficult to obtain a satisfactory S/N ratio.

$\alpha$-Se has relatively high dark resistance and can be employed with $10^{15} \Omega \cdot cm$ (at $10V/\mu m$). However, in the case where $\alpha$-Se is used for detecting photostimulated luminescent light, the dark resistance thereof is insufficient to obtain an image with a satisfactory S/N ratio and is therefore desired to be greater than $10^{15} \Omega \cdot cm$. Furthermore, the solid-state image detector has not only the problem of dark current but also the problem that, because a pseudo signal occurs because of residual electric charge left unread, an image with a satisfactory S/N ratio cannot be obtained.

SUMMARY OF THE INVENTION

The present invention has been made in view of the aforementioned circumstances. Accordingly, it is the primary object of the present invention to provide an image information reading method and an image information reading apparatus that are capable of obtaining an image whose S/N ratio is satisfactory, without being subjected to the influence of dark current or residual electric charge, when reading out image information from an image recording sheet by use of an solid-state image detector.

To achieve the objects mentioned above and in accordance with the present invention, there is provided a first method of obtaining an image signal, comprising the steps of: preparing an image recording sheet having a stimulable phosphor layer which emits photostimulated luminescent light by a quantity corresponding to stored energy when irradiated with stimulating light; scanning the image recording sheet in horizontal and vertical scanning directions with the stimulating light; and obtaining the image signal by detecting the photostimulated luminescent light emitted by the scanning, with a solid-state image detector having a photoconductor; wherein a signal, output from the solid-state image detector when scanning a non-image region other than an image recording region on the image recording sheet with the stimulating light, is detected as a correction signal; and a non-image component, contained in a signal output from the solid-state image detector when scanning the image recording region with the stimulating light, is suppressed with the correction signal.

In the case where a light beam is used as the stimulating light, the aforementioned horizontal scanning direction refers to a direction in which the stimulating light and the scanning speed are relatively high, while the aforementioned vertical scanning direction refers to a direction in which the stimulating light and the scanning speed are relatively low. On the other hand, in the case where long line light is used as the stimulating light, the horizontal scanning direction refers to a direction in which the line light extends, while the vertical scanning direction refers to a direction in which the line light is moved with respect to the image recording sheet.

The expression "non-image region other than an image recording region on the image recording sheet" is intended to mean a region where photostimulated luminescent light carrying image information is not incident on the solid-state image detector even if the stimulating light is scanned on the region. In connection with this meaning, it does not matter whether or not image information has been recorded on the stimulable phosphor sheet. The non-image region may be a non-image region, formed so that photostimulated luminescent light carrying image information is not emitted, such as a region having no stimulable phosphor layer and a region formed so that radiation energy is not stored by intercepting radiation with a lead plate at the time of photographing. Also, it maybe a region on the stimulable phosphor sheet which corresponds to a portion formed so that photostimulated luminescent light is not incident on the detector with a member for intercepting photostimulated luminescent light, regardless of whether or not image information has been actually recorded. Furthermore, it maybe a region outside the stimulable phosphor sheet where no photostimulated luminescent light occurs.

In the aforementioned first method, the aforementioned correction signal is a signal obtained when scanning the vertical leading edge or trailing edge of the non-image region with the stimulating light. Alternatively, the correction signal is a signal obtained when scanning the horizontal leading edge or trailing edge of the non-image region with the stimulating light. Also, it is preferable that each of the vertical leading and trailing edges and horizontal leading and trailing edges of the non-image region be a region on the image recording sheet immediately before or immediately after the image recording region.

In accordance with the present invention, there is provided a second method of obtaining an image signal, comprising the steps of: preparing an image recording sheet having a stimulable phosphor layer which emits photostimulated luminescent light by a quantity corresponding to stored energy when irradiated with stimulating light; scanning the image recording sheet in horizontal and vertical scanning directions with the stimulating light; and obtaining the image signal by detecting the photostimulated luminescent light emitted by the scanning, with a solid-state image detector having a photoconductor; wherein a signal, output from the solid-state image detector when the stimulating light is in an OFF state, is detected as a correction signal; and a non-image component, contained in a signal output from the solid-state image detector when scanning the image recording region with the stimulating light, is suppressed with the correction signal.

The expression "the stimulating light is in an OFF state" is intended to mean the state in which the stimulating light is not emitted from the stimulating-light source by switching off the stimulating-light source directly with an electrical signal, or switching off a power source for the stimulating-light source.

In accordance with the present invention, there is provided a third method of obtaining an image signal, comprising the steps of: preparing an image recording sheet having a stimulable phosphor layer which emits photostimulated luminescent light in a quantity corresponding to stored energy when irradiated with stimulating light; scanning the image recording sheet in horizontal and vertical scanning directions with the stimulating light; and obtaining the image signal by detecting the photostimulated luminescent light emitted by the scanning, with a solid-state image detector having a photoconductor; wherein a signal, output from the solid-state image detector when stimulating light incident on the image recording sheet is intercepted, is detected as a correction signal; and a non-image component, contained in a signal output from the solid-state image detector when scanning the image recording region with the stimulating light, is suppressed with the correction signal.

The expression "when stimulating light incident on the image recording sheet is intercepted" is intended to mean, for example, when stimulating light incident on the image recording sheet is intercepted by a shutter, etc.

In the first, second, and third methods of the present invention, it is preferable that the photoconductor of the solid-state image detector have amorphous selenium at its main component.

In accordance with the present invention, there is provided a first apparatus for carrying out the first method of the present invention. The first apparatus comprises scan means for scanning stimulating light in horizontal and vertical scanning directions on an image recording sheet having a stimulable phosphor layer which emits photostimulated luminescent light in a quantity corresponding to stored energy when irradiated with the stimulating light; a solid-state image detector with a photoconductor which generates electric charge when irradiated with the photostimulated luminescent light; acquisition means for obtaining an image signal in accordance with the quantity of the electric charge generated in the photoconductor; and suppression means for obtaining a signal, output from the solid-state image detector when scanning a non-image region other than an image recording region on the image recording sheet with the stimulating light, as a correction signal, and suppressing a non-image component, contained in a signal output from the solid-state image detector when scanning the image recording region with the stimulating light, with the correction signal.

In the first apparatus of the present invention, the correction signal obtained by the suppression means may be a signal obtained when scanning the vertical leading edge or trailing edge of the non-image region with the stimulating light. Also, the correction signal obtained by the suppression means may be a signal obtained when scanning the horizontal leading edge or trailing edge of the non-image region with the stimulating light.

In accordance with the present invention, there is provided a second apparatus for carrying out the second method of the present invention. The second apparatus comprises scan means for scanning stimulating light in horizontal and vertical scanning directions on an image recording sheet having a stimulable phosphor layer which emits photostimulated luminescent light in a quantity corresponding to stored energy when irradiated with the stimulating light; a solid-state image detector with a photoconductor which generates electric charge when irradiated with the photostimulated luminescent light; acquisition means for obtaining an image signal in accordance with the quantity of the electric charge generated in the photoconductor; control means for controlling an ON/OFF state of the stimulating light; and suppression means for obtaining a signal, output from the solid-state image detector when the stimulating light is in the OFF state, as a correction signal, and suppressing a non-image component, contained in a signal output from the solid-state image detector when scanning the image recording region with the stimulating light, with the correction signal.

The aforementioned "control means" refers, for example, to means for controlling the ON/OFF state of the stimulating light by sending an electrical signal directly to the stimulating-light source, and means for controlling the ON/OFF state of the stimulating light by controlling the ON/OFF state of the power source for the stimulating-light source.

In accordance with the present invention, there is provided a third apparatus for carrying out the third method of the present invention. The third apparatus comprises scan means for scanning stimulating light in horizontal and vertical scanning directions on an image recording sheet having a stimulable phosphor layer which emits photostimulated luminescent light by a quantity corresponding to stored energy when irradiated with the stimulating light; a solid-state image detector with a photoconductor which generates electric charge when irradiated with the photostimulated luminescent light; acquisition means for obtaining an image signal in accordance with the quantity of the electric charge generated in the photoconductor; interception means for intercepting stimulating light incident on the image recording sheet; and suppression means for obtaining a signal, output from the solid-state image detector when stimulating light incident on the image recording sheet is intercepted by the interception means, as a correction signal, and suppressing a non-image component, contained in a signal output from the solid-state image detector when scanning the image recording region with the stimulating light, with the correction signal.

In the aforementioned third apparatus, the "interception means" refers to a shutter, etc.

In the first, second, and third apparatuses of the present invention, it is preferable that the photoconductor of the solid-state image detector have amorphous selenium at its main component.

As described above, the first method and apparatus of the present invention use a signal, output from the solid-state image detector when scanning the non-image region with the stimulating light, in order to suppress a non-image component, contained in a signal output from the solid-state image detector when scanning the image recording region with the stimulating light. Thus, the first method and apparatus of the present invention are capable of reproducing a high-quality image, while removing a dark current component and a dark latent-image component which are steadily output from the detector.

The second method and apparatus of the present invention employ a signal, output from the solid-state image detector when the stimulating light is in an OFF state, in order to suppress the non-image component. Thus, the second method and apparatus of the present invention are capable of obtaining the same effect as the first method and apparatus of the present invention, with simpler construction and control.

The third method and apparatus of the present invention employ a signal, output from the solid-state image detector when stimulating light incident on the image recording sheet is intercepted, in order to suppress the non-image component. Therefore, the third method and apparatus of the present invention are also capable of obtaining the same effect as the second method and apparatus of the present invention.

BRIEF DESCRIPTION OF THE DRAWINGS

The present invention will be described in further detail with reference to the accompanying drawings wherein.

DESCRIPTION OF THE PREFERRED EMBODIMENTS

Figure 1A:
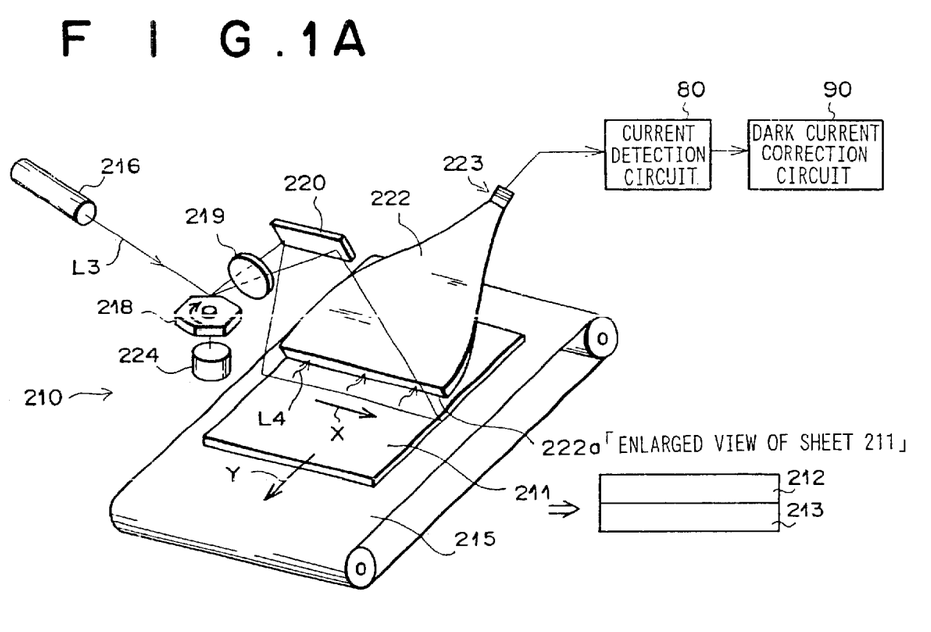
FIG. 1A is a perspective view of a radiation image reading apparatus replacing a photomultiplier with a solid-state image detector.
Figure 1B:
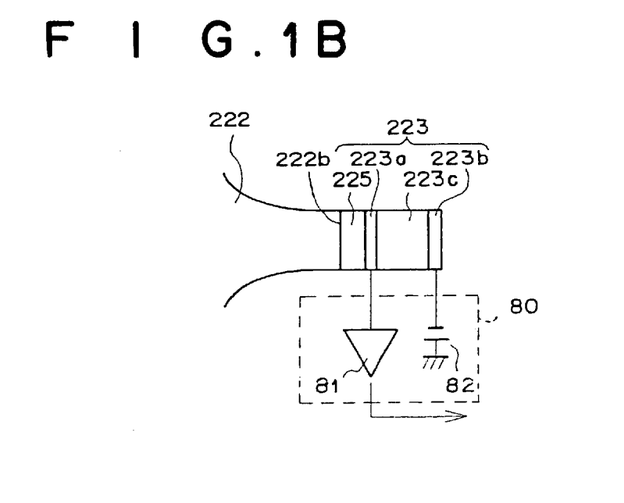
FIG. 1B is a sectional view showing the solid-state image detector and a current detection circuit for the detector.

Referring now in greater detail to the drawings and initially to FIG. 1, there is shown a radiation image reading apparatus, disclosed in the aforementioned Japanese Unexamined Patent Publication No. 55(1980)-12492, which utilizes a stimulable phosphor sheet as an image recording sheet. In the radiation image reading apparatus, a photomultiplier as photoelectric reading means for detecting photostimulated luminescent light emitted from the stimulable phosphor sheet is replaced with a solid-state image detector 223.

The solid-state image detector 223 is made up of two flat electrodes 223a, 223b, and a photoconductive layer 223c, interposed between the flat electrodes 223a, 22b, which exhibits conductivity when irradiated with photostimulated luminescent light L4. The solid-state image detector 223 functions as a 0-dimensional sensor for detecting the photostimulated luminescent light L4 incident through an optical guide 222 and a stimulating-light cut filter 225.

For the front flat electrode 223a on which the photostimulated luminescent light L4 is incident, it is preferable to use a known transparent conductive film, such as an indium tin oxide (ITO) film, etc., so that the electrode 223a can have a transmissibility to the photostimulated luminescent light L4 incident via the stimulating-light cut filter 25. The rear flat electrode 223b, on the other hand, does not need to have transmissibility and may be, for example, an aluminum electrode.

The photoconductive layer 223c of the solid-state image detector 223 uses a substance that exhibits conductivity when irradiated with the photostimulated luminescent light L4 emitted from the stimulable phosphor layer 212 of a stimulable phosphor sheet 211. More specifically, in a combination with the stimulable phosphor layer 212 which emits blue photostimulated luminescent light of wavelength 500 nm or less (e.g., wavelength in the vicinity of 400 nm), a photoconductive substance having amorphous selenium ($\alpha$-Se) as its main component is preferred.

The size (detection area) of this photoconductive layer 223c ($\alpha$-Se photoconductive film) is made sufficiently small compared with the size of the stimulable phosphor sheet 211 (e.g., 430 mm×430 mm, or 17 inches square). For instance, it is made 50 millimeters square or less. Thus, if the area of the photoconductive film is made small, the generation of excessive dark current can be avoided and the load capacitance can also be made small. As a result, a satisfactory S/N ratio can be obtained, compared with a detecting panel where the stimulable phosphor layer and the photoconductive layer are opposed at approximately 1:1.

On the other hand, it is preferable that the thickness of the photoconductive layer 223c be 1 μm or greater in order to absorb the photostimulated luminescent light L4 sufficiently, and in order to obtain an avalanche amplification action so that the signal level which can be taken out is increased. It is also preferable that the thickness of the photoconductive layer 223c be thick in order to make the distribution capacitance small so that fixed noise is suppressed. However, if the film thickness is too thick, there is a disadvantage that the power source voltage will become great. Therefore, the film thickness is set, for example, between 1 and 100 μm, preferably between 10 and 50 μm, so that the ratio of the avalanche amplification effect and the fixed noise becomes great, while taking the power source voltage into consideration.

As mentioned above, the stimulating-light cut filter 225 is provided between the exit end face 222b of the optical guide 222 and the front electrode 223a on the entrance end face side of the solid-state image detector 223. If red stimulating light L3 having no image information is incident into the photoconductive layer 223c through the optical guide 222, the photoconductive layer 223c generates offset current by a small amount of electric charge generated by the stimulating light L3, because it has a slight sensitivity to the red stimulating light L3. On the other hand, if the stimulating-light cut filter 225 is inserted, it will be able to suppress offset current, because it absorbs red light (of wavelength 600 nm or greater) and allows only blue photostimulated luminescent light to be incident on the photoconductive layer 223c. Note that because the photoconductive layer 223c has a low sensitivity to red stimulating light of wavelength 600 nm or greater, the stimulating-light cut filter 225 can be made thin, compared with a conventional detector employing a photomultiplier.

Figure 2:
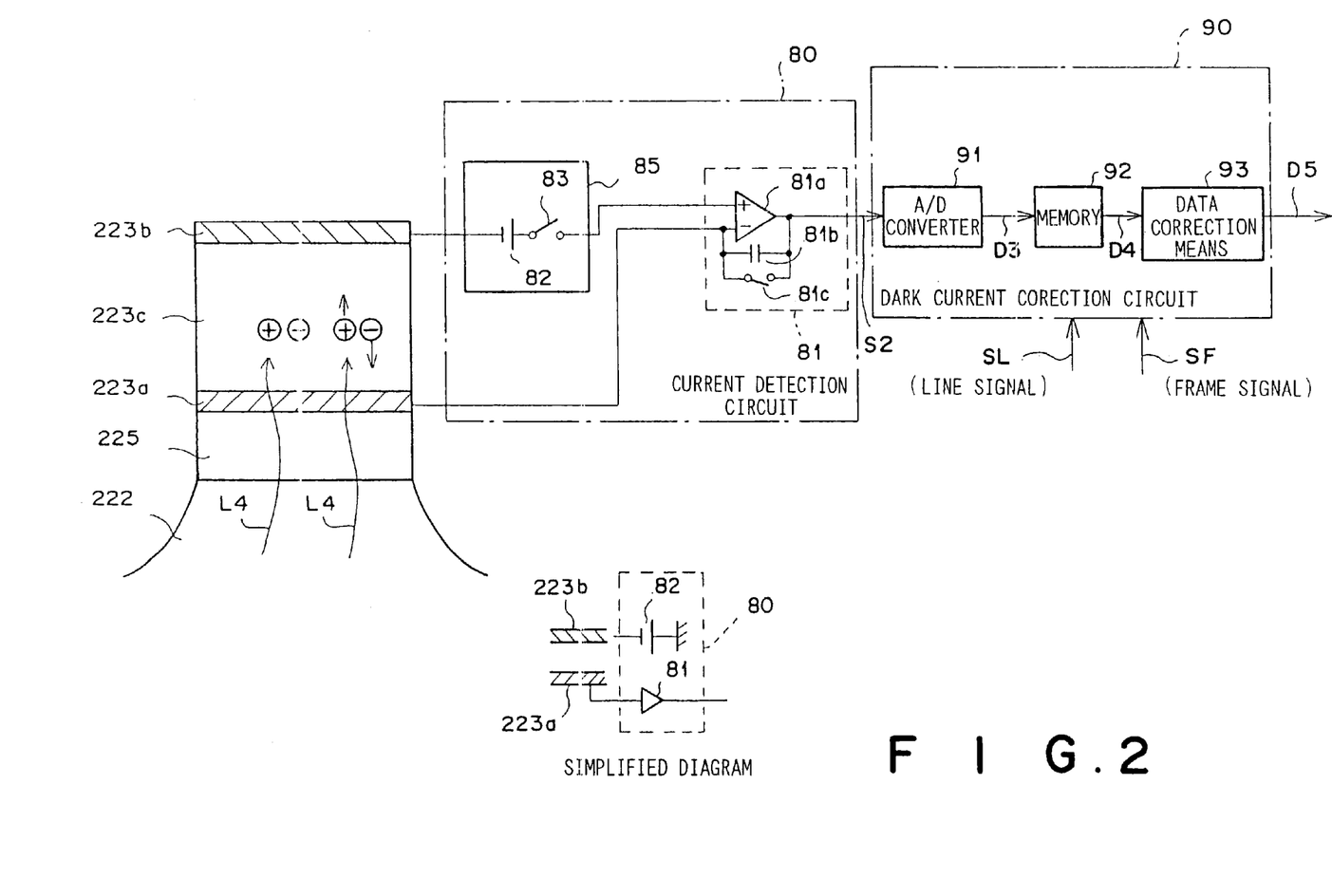
FIG. 2 is a block diagram showing circuitry for obtaining an electrical signal by reading out electric charge from the solid-state image detector.

FIG. 2 illustrates circuitry for obtaining an electrical signal by reading out electric charge from the solid-state image detector 223. The circuitry is provided with a current detection circuit (image signal acquisition means) 80 connected with the solid-state image detector 223, and a dark current correction circuit (non-image component suppression means) 90 for correcting for a dark current component which flows in the detector 223 regardless of whether or not photostimulated luminescent light is irradiated, while an electric field is being generated in the photoconductive layer 223c.

The current detection circuit 80 has a detecting amplifier 81. The detecting amplifier 81 is constructed of an operational amplifier 81a, an integrating capacitor 81b, and a switch 81c. The front electrode 223a of the solid-state image detector 223 is connected to the inverting input terminal (−) of the operational amplifier 81a. The current detection circuit 80 further has voltage application means 85a, which consists of a power source 82 and a switch 83. The voltage application means 85a is used for applying a predetermined voltage between both electrodes 223a and 223b of the solid-stage image detector 223 to generate an electric field in the photoconductive layer 223c. The positive electrode of the power source 82 is connected to the non-inverting terminal (+) of the operational amplifier 81a through the switch 83. The magnitude of the voltage of the power source 82 is set so that the potential gradient within the optical photoconductive layer 223c is $10^6$ V/cm or greater so that an avalanche amplification action occurs within the photoconductive layer 223c.

The detecting amplifier 81 is used for obtaining an electrical signal which corresponds to the energy stored in the stimulable phosphor layer 212, by detecting a current which flows in reading out the electric charge generated when the photostimulated luminescent light L4 is incident from the stimulable phosphor layer 212 into the photoconductive layer 223c.

The stimulable phosphor sheet 211 as an image recording sheet is formed by stacking the stimulable phosphor layer 212, which emits photostimulated luminescent light by a quantity corresponding to stored energy when irradiated with stimulating light, on a base 213. The stimulable phosphor layer 212 may be any type of material as long as it emits photostimulated luminescent light of wavelength 500 nm or less (preferably, 400 to 450 nm) when stimulated with red stimulating light of wave length 600 nm or greater. Stimulable phosphor sheets well known in the related art can be utilized. Note that although not shown, a protective layer and a sensitizing layer, for example, are provided in addition to the stimulable phosphor layer 212.

When reading out image information from the stimulable phosphor sheet 211, the switch 83 is first switched on, whereby voltage is applied between both electrodes 223a and 223b of the detector 233 through the imaginary short of the operational amplifier 81a, and an electric field is generated in the photoconductive layer 223c. Then, with a strong electric field generated in the photoconductive layer 223c, the whole surface of the stimulable phosphor sheet 211 is scanned with the stimulating light L3 in the form of a beam. More specifically, the stimulable phosphor sheet 211 with a radiation image recorded thereon, set at a predetermined position on a reading section, is conveyed in the direction of arrow Y (i.e., a vertical scanning direction) by sheet conveying means 215, such as an endless belt, etc., which is driven by drive means (not shown). On the other hand, the red light beam (red stimulating light) L3, emitted from the laser light source 216, is reflected and deflected by a rotating polygon mirror 218 being rotated at high speed in the direction of an arrow by a motor 224. After being passed through a convergent lens 219 such as an fθ lens, the light beam L3 is incident on the stimulable phosphor sheet 211 through a mirror 220 and is scanned on the stimulable phosphor sheet 211 in the horizontal scanning direction (indicated by an arrow X) approximately perpendicular to the vertical scanning direction (i.e., the direction of arrow Y).

With the horizontal scanning, photostimulated luminescent light L4 of wave length 400 nm or so (blue light band), which has a quantity of light corresponding to the radiation image information stored on the stimulable phosphor sheet 211, is emitted from a position on the stimulable phosphor sheet 211 irradiated with the light beam L3. The photostimulated luminescent light L4 is incident on the entrance end face 222a of the optical guide 222, and travels through the optical guide 222 while repeating total reflection. The photostimulated luminescent light L4 emitted from the exit end face 222b of the optical guide 222 is incident on the solid-state image detector 223. As will be seen from the foregoing description, the laser light source 216, the rotating polygon mirror 218, the convergent lens 219, and drive means (not shown) as a whole constitute stimulating-light scan means 210.

Within the photoconductive layer 223c of the solid-state image detector 223, a pair of positive and negative charges with a quantity corresponding to the light quantity of the photostimulated luminescent light L4 are generated by the irradiation of the photostimulated luminescent light 4. With the electric field generated in the photoconductive layer 223c, the negative charge of the generated electric charge pair moves toward the front electrode 223a, while the positive charge moves toward the rear electrode 223b.

In addition, a strong electric field of $10^6$ V/cm or greater has been generated in the photoconductive layer 223c, so an avalanche amplification action occurs and the generation of pairs of positive and negative charges increases drastically within the photoconductive layer 223c. Since the quantum efficiency of the phosphor layer 212 is low, and the quantity of the photostimulated luminescent light L4 emitted from the phosphor layer 212 is small, the quantity of the electric charge pairs (i.e., the number of signal photons) that is generated by the direct irradiation of the photostimulated luminescent light L4 is small. However, the avalanche amplification action amplifies the quantity of the electric charge generated (i.e., the charge doubling function is performed), so a sufficiently large signal can be obtained and the S/N ratio can be enhanced.

The operational amplifier 81a has been provided between both electrodes 223a and 223b of the solid-state image detector 223, so the current detecting amplifier 81 is capable of obtaining an image signal by detecting the current generated by the aforementioned movement of the electric charge. That is, the current detecting amplifier 81 is capable of reading out a radiation image signal. Because the thickness of the photoconductive layer 223c with amorphous selenium (α-Se) as its main component is set between 1 and 100 μm, as described above, the quantum efficiency of the photoconductive layer 223c with respect to blue photostimulated luminescent light of wavelength 400 nm or so, for example, can be made as high as 60 to 70%, compared with a photomultiplier, or an avalanche photodiode employing silicon (Si). Furthermore, since an electric field such that avalanche amplification is obtained is generated in the photoconductive layer 223c to perform image reading, and a correction for power source voltage fluctuations is made, the S/N ratio of the image signal can be considerably enhanced.

As mentioned above, the photoconductive layer 223c has amorphous selenium (α-Se) as its main component, so the ratio of a sensitivity to photostimulated luminescent light in the vicinity of a wavelength of 400 nm and a sensitivity to stimulating light of wavelength about 600 to 700 nm can be sufficiently increased. For example, when the film thickness of α-Se is 10 μm with no avalanche amplification action, the ratio of a sensitivity to blue light (of wavelength 470 nm) and a sensitivity to red light (of wavelength 680 nm) becomes about 3.5 digits (=about 150:1). This value is an extremely large value, compared with the case where the blue-to-red sensitivity ratio becomes about 2 digits (=about 10:1) when a photomultiplier is used as the photoelectric conversion means. Note that if the film thickness of α-Se becomes thinner, a sensitivity to red light will be reduced and therefore the blue-to-red sensitivity ratio will be further increased. It is a matter of course that if an avalanche amplification action is generated in the photoconductive layer 223c, the blue-to-red sensitivity ratio will become even greater.

The solid-state image detector 223 can be reduced in size and weight, compared with conventional photomultipliers. Therefore, the aforementioned apparatus replacing the conventional photomultiplier with the solid-state image detector 223 can also be reduced in size and weight. In addition, the photoconductive layer 223c with amorphous selenium (α-Se) as its main component can be easily fabricated, because it can be fabricated in a stacked state by low-temperature deposition. Furthermore, the photoconductive layer 223c is not easily affected by mechanical shock, because unlike a photomultiplier, it is not made of glass.

In the solid-state image detector 223, incidentally, a non-image component, which carries no original image information, such as a dark current component, a dark latent image component, etc., flows regardless of whether or not the photostimulated luminescent light is irradiated, while an electric field is being generated in the photoconductive layer 223c. As a result, this non-image component is also contained in a signal current being obtained during image reading. In the dark current correction circuit 90, a correction such that the non-image component is reduced is made in the manner described below.

Figure 3:
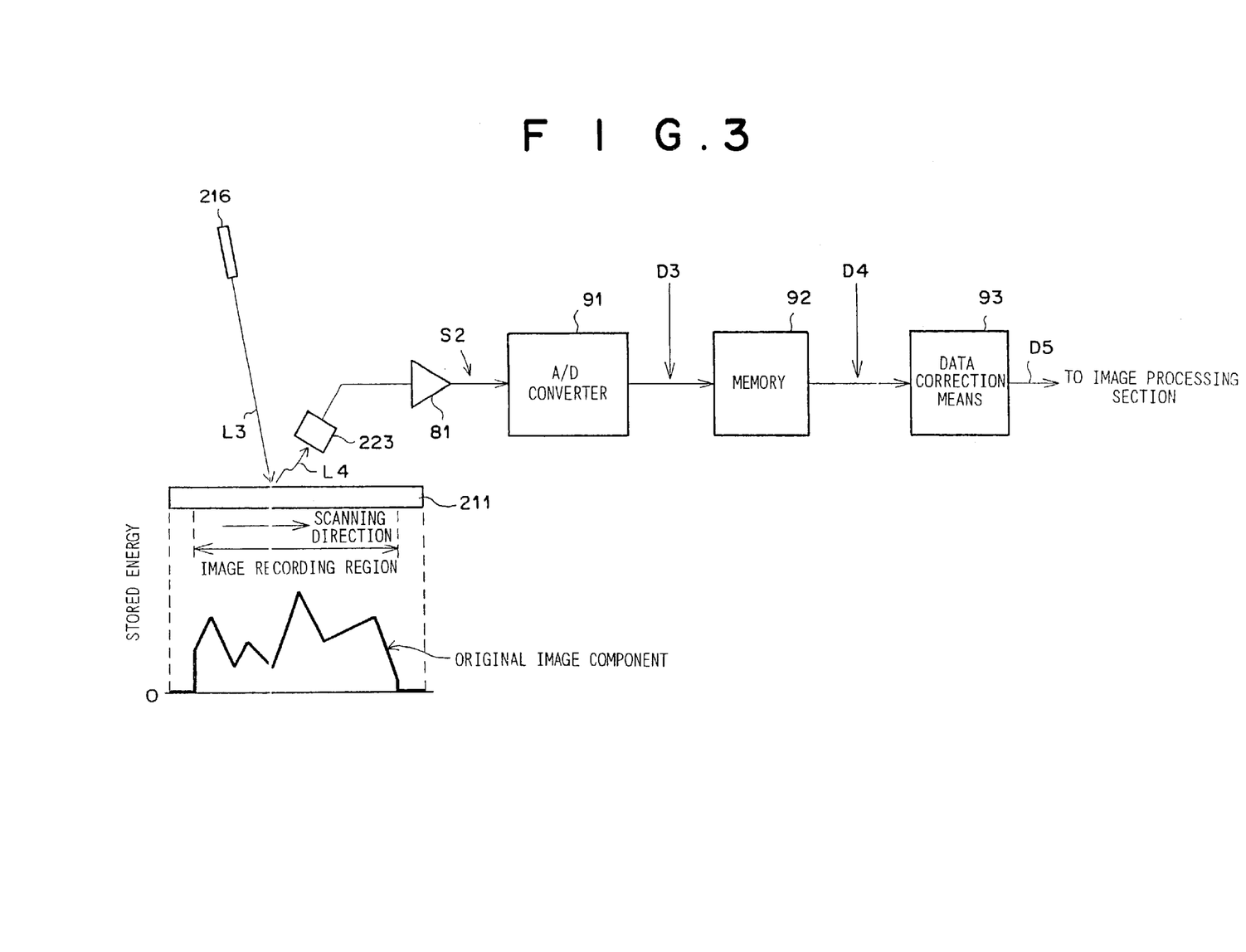
FIG. 3 is a schematic diagram showing the steps of scanning a stimulable phosphor sheet with stimulating light, detecting photostimulated luminescent light emitted from the stimulable phosphor sheet with a detector, and correcting for dark current by a dark current correction circuit.
Figure 4:
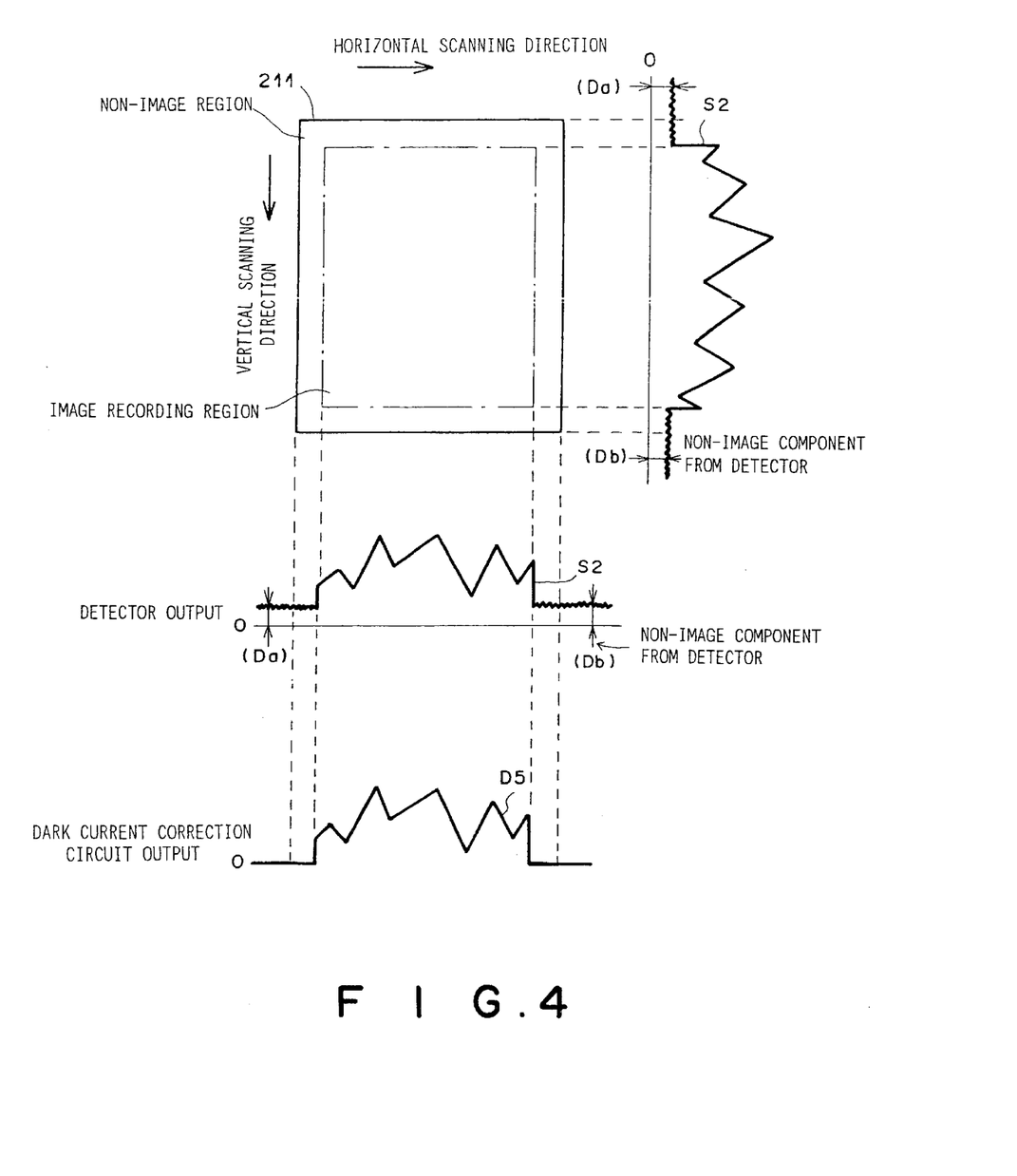
FIG. 4 is a diagram showing the corresponding relationship between the image recording region and non-image region of the stimulable phosphor sheet, a signal obtained from the detector, and an output signal from the dark current correction circuit.
Figure 5:
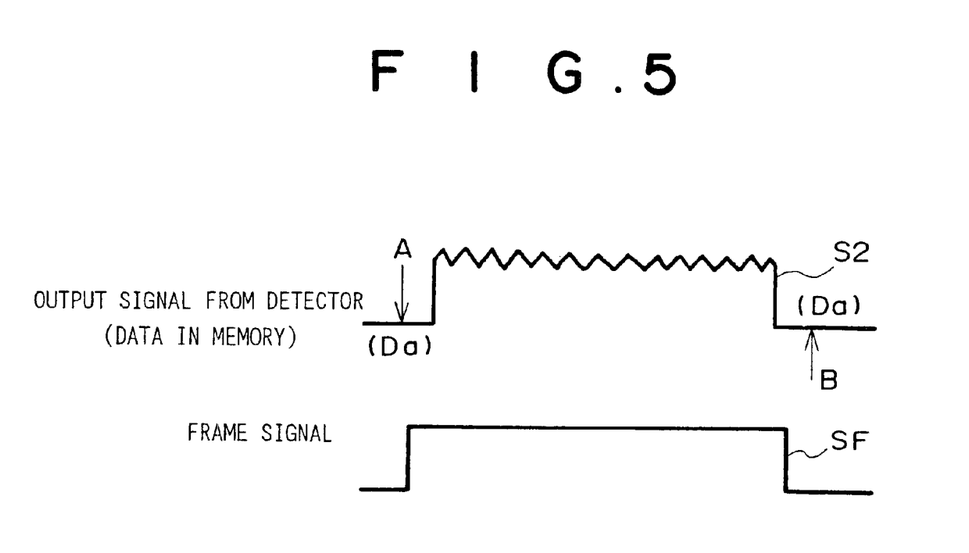
FIG. 5 is a conceptual diagram showing the time relationship between a signal for one frame and a frame signal.
Figure 6:
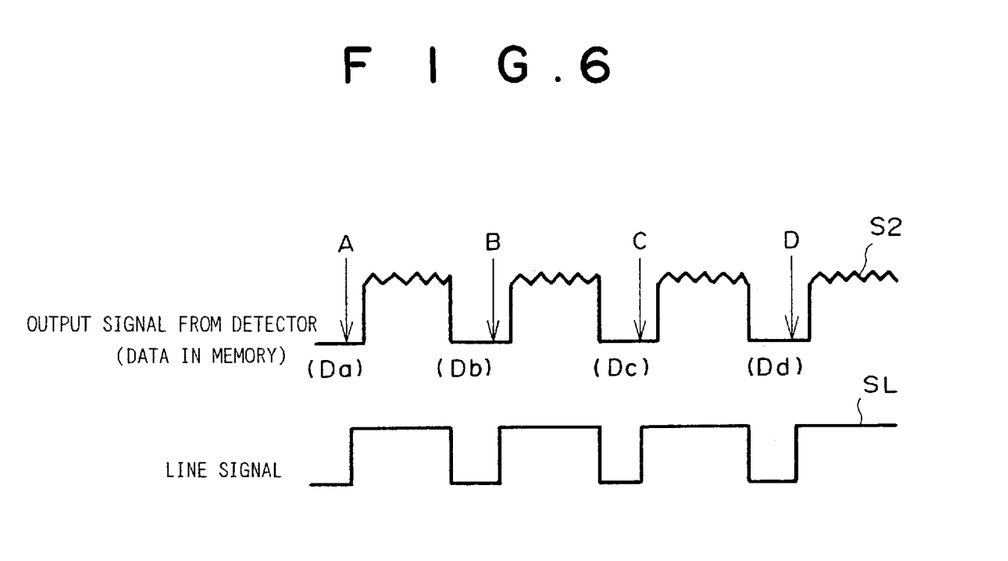
FIG. 6 is a conceptual diagram showing the time relationship between a signal for a few lines and a line signal.

FIG. 3 illustrates the steps of scanning the stimulable phosphor sheet 211 with the light beam L3, detecting photostimulated luminescent light L4 emitted from the stimulable phosphor sheet 211 according to the scanning with the detector 223, and obtaining an image signal based on a detected signal S2. FIG. 4 illustrates the corresponding relationship between the image recording region and non-image region of the stimulable phosphor sheet 211, the signal S2 obtained from the detector 223, and an output signal D5 from the dark current correction circuit 90. FIG. 5 conceptually illustrates the time relationship between a signal S2 for one frame and a frame signal SF. FIG. 6 conceptually illustrates the time relationship between a signal S2 for a few lines and a line signal SL.

The dark current correction circuit 90 is provided with an A/D converter 91, memory 92, and data correction means 93. The line signal SL representing a reference for horizontal scanning, and the frame signal SF representing a reference for vertical scanning, are input to the dark current correction circuit 90. In the dark current correction circuit 90, a current value from the detector 223 is read during the periods, in the vicinities of a leading edge and a trailing edge in the line signal SL or frame signal SF, when no stimulating light has reached the stimulable phosphor sheet 211 and therefore no photostimulated luminescent light is incident on the detector 223, or the period when the stimulating light has reached the stimulable phosphor sheet 211 but is being scanned on the non-image region (these periods are referred to as non-image periods). The read current value is converted to a digital value by the A/D converter 91 and is stored in the memory 92. The data for the image recording region is also stored in the memory 92.

In this embodiment, digital data is read during the period when no stimulating light has reached the stimulable phosphor sheet 211 and therefore no photostimulated luminescent light L4 is incident on the detector 223. That is, digital data is read during an out-of-sheet period. The data during the out-of-sheet period is employed as a signal for correction.

For example, in the case of correcting for a non-image component at a frame rate, a signal value $D_a$ during the out-of-sheet period, indicated by an arrow A in the vicinity of a leading edge in the frame signal SF, and a signal value $D_b$ during the out-of-sheet period, indicated by an arrow B in the vicinity of a trailing edge in the frame signal SF, are read. That is, the signal $D_a$ and the signal $D_b$ are read before and after reading, respectively. The individual values $D_a$ and $D_b$ are stored in the memory 92. These values represent a current that flows in the detector 223 during the period when no photostimulated luminescent light is incident on the detector 223. That is, the values $D_a$ and $D_b$ represent a dark current component or residual electric charge component (non-image component).

In the data correction means 93, the value $D_a$ detected before reading is employed as a correction value to perform data correction so that a non-image component in the entire image for one frame can be uniformly reduced (or suppressed). As the data correction, the correction value $D_a$ can be subtracted from the data value for each pixel being read, or a small signal level side can be compressed according to the magnitude of the correction value $D_a$.

A value $D_{ab}$ at each pixel position, obtained by the interpolation between the value $D_a$ detected before reading and the value $D_b$ detected after reading, may be employed as a correction value for each pixel so that a non-image component can be reduced.

In the case of employing the value $D_b$ as a correction value in correcting for a non-image component at a frame rate, it is necessary to make correction calculations for all the pixels (all lines) after reading of all the pixels. Therefore, data D3 obtained during image reading is stored temporarily in the memory 92, and after image reading, correction calculations are performed on data D4, read out from the memory 92, for the image recording region, by using the correction data $D_b$.

While the above-mentioned embodiment employs the signal values $D_a$ and $D_b$ obtained during the out-of-sheet period (i.e., when a portion other than the stimulable phosphor sheet 211 is being scanned with the light beam L3), signals obtained when scanning the non-image region on the stimulable phosphor sheet 211 with the light beam L3 can be employed as the correction values $D_a$ and $D_b$, as illustrated in FIG. 4.

In the case of correcting for a non-image component at a line rate, signal values $D_a$, $D_b$, $D_c$, . . . during the out-of-sheet period, indicated by arrows A, B, C, . . . in the vicinities of the leading edges of lines in the line signal SL, are read as shown in FIG. 6. That is, values immediately before reading of each line are read. The signal values $D_a$, $D_b$, $D_c$, . . . are stored in the memory 92.

In the data correction means 93, as with the case of the frame rate, each value read immediately before reading of each line is employed as a correction value so that a non-image component in the one line is uniformly reduced.

Also, a value at each pixel position, obtained by the interpolation between a value (e.g., $D_a$) read before reading of a line and another value (e.g., $D_b$) read before reading of the next line, may be employed as a correction value for each pixel in each line to reduce a non-image component.

In addition, a value, calculated by performing a moving average method on the signal values $D_a$, $D_b$, $D_c$, . . . read before reading of each line, may be employed as a correction value.

For each of the signal values $D_a$, $D_b$, $D_c$, . . . , obtained before or after reading, which represent a non-image component, an average value obtained by performing reading a plurality of times may be employed as a correction value regardless of the frame rate or line rate. In this case, a correction for the dark current can be performed with a high degree of accuracy.

The correction calculations in correcting for a non-image component at a line rate may be done for each pixel, or each line, being read. Also, the correction calculations may be done for a plurality of pixels or lines. Furthermore, the correction calculations may be done for all pixels (which also implies all lines) after reading.

Even in the case of correcting for a non-image component at a line rate, the correction values $D_a$, $D_b$, $D_c$, . . . are limited not only to the signals obtained when scanning a portion other than the stimulable phosphor sheet 211 with the light beam L3, but the signals obtained when scanning a non-image region on the stimulable phosphor sheet 211 with the light beam L3, as shown in FIG. 4, can also be employed as the correction values $D_a$, $D_b$, $D_c$, . . . .

Figure 7:
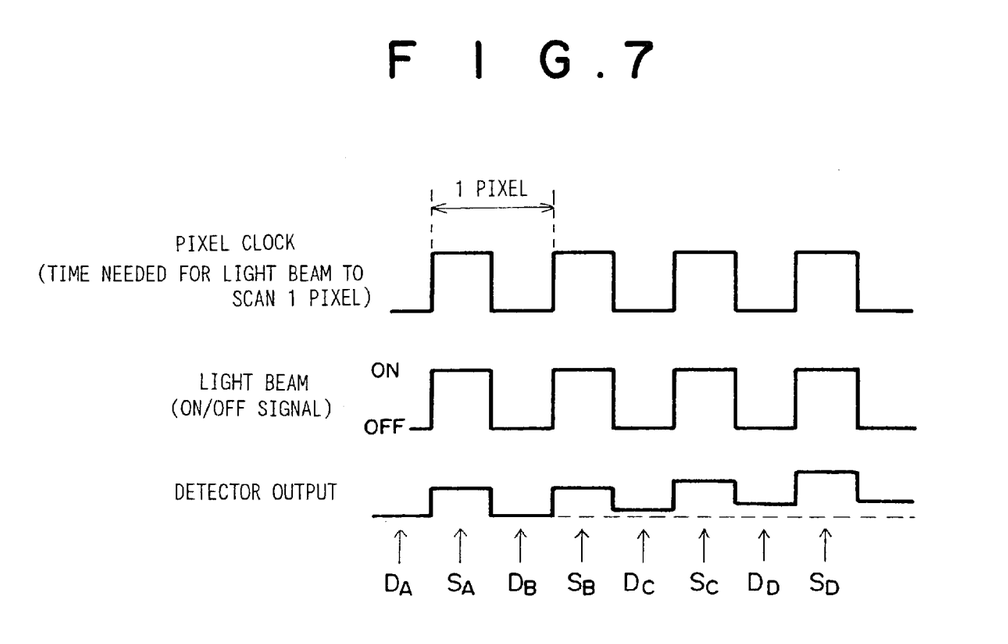
FIG. 7 is a diagram showing how stimulating light is controlled to obtain correction signals.

The method of obtaining correction signals are not always limited to the methods in the above-mentioned embodiment. For example, stimulating-light control means (not shown) to control the OFF state of the laser light source 216 may be provided so that when the laser light source 216 is in the OFF state, a signal from the solid-state image detector 223 can be used as a correction signal. For instance, as illustrated in FIG. 7, the ON/OFF state of the laser light source 216 is controlled in synchronization with a pixel clock signal (which represents the time needed for stimulating light to scan one pixel) by a control signal output from the stimulating-light control means, and signals $D_A$, $D_B$, $D_C$, $D_D$, . . . which are obtained when the laser light source 216 is in the OFF state, can be employed as correction signals. As illustrated in the output of the solid-state image detector of FIG. 7, each of the image signals $S_A$, $S_B$, $S_C$, $S_D$, . . . for pixels, output from the solid-state image detector, is subjected to the influence of the residual electric charge for the previous pixel. The influence of the residual electric charge can be suppressed by subtracting the correction signals $D_A$, $D_B$, $D_C$, $D_D$, . . . from the image signals $S_A$, $S_B$, $S_C$, $S_D$, . . . As described above, in the case where the output signal from the solid-state image detector is employed as a correction signal, when the laser light source 216 is in the OFF state, the correction signal does not always need to be obtained for each pixel. For example, as with the above-mentioned embodiment, the correction signal may be obtained at a frame rate or a line rate.

Figure 8:
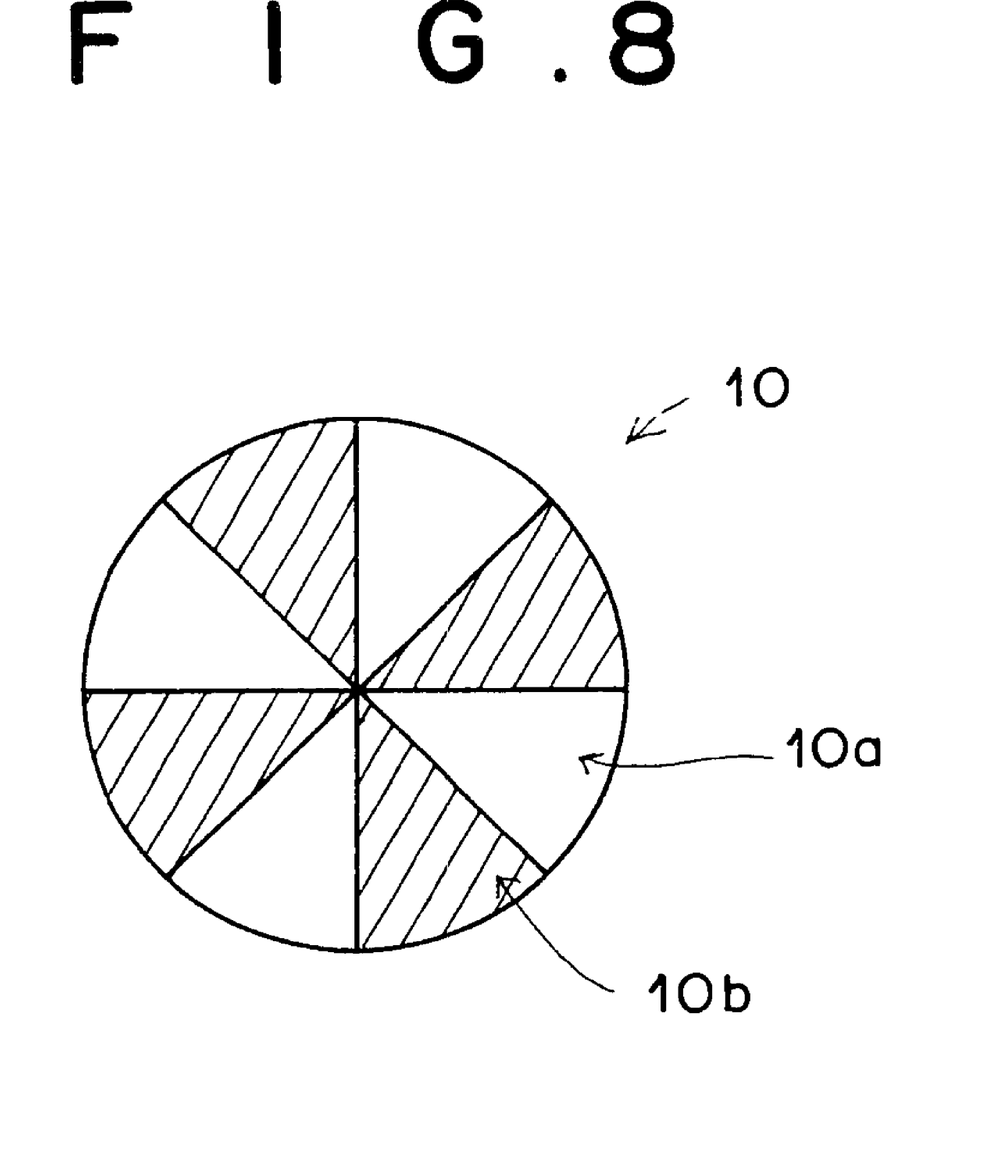
FIG. 8 is a diagram showing how stimulating light is intercepted by a rotary filter.

In addition, there may be provided a shutter for intercepting the light beam L3 which is emitted from the laser light source 216. When irradiation of the light beam L3 is being intercepted by the shutter, an output signal from the solid-state image detector can be obtained as a correction signal. For instance, a rotary filter 10a, which consists of light transmitting portions 10a and light intercepting portions 10b, such as that illustrated in FIG. 8, is interposed between the laser light source 216 and the rotating polygon mirror 218. If the rotary filter 10 is rotated in synchronization with the pixel clock signal (which represents the time needed for stimulating light to scan one pixel), similar image signals and correction signals can be obtained in the same manner mentioned above. The shutter for intercepting the light beam L3 is not limited to mechanical shutters such as the above-mentioned filter 10, but may be an acousto-optic modulator utilizing an acousto-optic effect, a liquid shutter, etc.

While the present invention has been described with reference to the preferred embodiment thereof, the invention is not to be limited to the details given herein, but may be modified within the scope of the invention hereinafter claimed.

For example, in the aforementioned embodiment, calculations employing digital data (software process) are made in performing data correction so that a non-image component, such as a dark current component, etc., can be reduced. However, the non-image component may be suppressed with a hardware process such as an analog circuit, a digital circuit, etc.

In the aforementioned embodiment, a light beam is used as stimulating light and scanned in the horizontal and vertical scanning directions, and when a portion other than an image recording region is being scanned with the light beam, data is obtained as a non-image component and used for correction calculations. However, the light beam may be replaced with line light.

Furthermore, in the radiation image reading apparatus in the aforementioned embodiment, the most widely used photomultiplier is replaced with a 0-dimensional solid-state image detector. However, the present invention is not limited to this image detector. For instance, as disclosed in Japanese Unexamined Patent Publication Nos. 2000-50201, 2000-50202, and 2000-50203, an image recording sheet and a two-dimensional detector may be disposed to face each other (they may be formed integrally or separately), or a 0-dimensional detector extending lengthwise may be used, or a one-dimensional line sensor may be used. The photoconductor in the solid-state image detector is not limited to α-se, but may be other semiconductors.

What is claimed is:

1. A method of obtaining an image signal, comprising the steps of:
   preparing an image recording sheet having a stimulable phosphor layer which emits photostimulated luminescent light in a quantity corresponding to stored energy when irradiated with stimulating light;
   scanning said image recording sheet in horizontal and vertical scanning directions with said stimulating light; and
   obtaining said image signal by detecting said photostimulated luminescent light emitted by the scanning, with a solid-state image detector having a photoconductor;
   wherein a signal, output from said solid-state image detector when scanning a non-image region other than an image recording region on said image recording sheet with said stimulating light, is detected as a correction signal; and
   a non-image component, contained in a signal output from said solid-state image detector when scanning said image recording region with said stimulating light, is suppressed with said correction signal.

2. The method as set forth in claim 1, wherein said correction signal is a signal obtained when scanning a vertical leading edge or trailing edge of said non-image region with said stimulating light.

3. The method as set forth in claim 2, wherein the photoconductor of said solid-state image detector has amorphous selenium at its main component.

4. The method as set forth in claim 1, wherein said correction signal is a signal obtained when scanning a horizontal leading edge or trailing edge of said non-image region with said stimulating light.

5. The method as set forth in claim 4, wherein the photoconductor of said solid-state image detector has amorphous selenium at its main component.

6. The method as set forth in claim 1, wherein the photoconductor of said solid-state image detector has amorphous selenium at its main component.

7. A method of obtaining an image signal, comprising the steps of:
   preparing an image recording sheet having a stimulable phosphor layer which emits photostimulated luminescent light in a quantity corresponding to stored energy when irradiated with stimulating light;
   scanning said image recording sheet in horizontal and vertical scanning directions with said stimulating light; and
   obtaining said image signal by detecting said photostimulated luminescent light emitted by the scanning, with a solid-state image detector having a photoconductor;
   wherein a signal, output from said solid-state image detector when said stimulating light is in an OFF state, is detected as a correction signal; and
   a non-image component, contained in a signal output from said solid-state image detector when scanning said image recording region with said stimulating light, is suppressed with said correction signal.

8. The method as set forth in claim 7, wherein the photoconductor of said solid-state image detector has amorphous selenium at its main component.

9. A method of obtaining an image signal, comprising the steps of:
   preparing an image recording sheet having a stimulable phosphor layer which emits photostimulated luminescent light in a quantity corresponding to stored energy when irradiated with stimulating light;
   scanning said image recording sheet in horizontal and vertical scanning directions with said stimulating light; and
   obtaining said image signal by detecting said photostimulated luminescent light emitted by the scanning, with a solid-state image detector having a photoconductor;
   wherein a signal, output from said solid-state image detector when incidence of said stimulating light on said image recording sheet is intercepted, is detected as a correction signal; and
   a non-image component, contained in a signal output from said solid-state image detector when scanning said image recording region with said stimulating light, is suppressed with said correction signal.

10. The method as set forth in claim 9, wherein the photoconductor of said solid-state image detector has amorphous selenium at its main component.

11. An apparatus for obtaining an image signal, comprising:
   scan means for scanning stimulating light in horizontal and vertical scanning directions on an image recording sheet having a stimulable phosphor layer which emits photostimulated luminescent light in a quantity corresponding to stored energy when irradiated with said stimulating light;
   a solid-state image detector with a photoconductor which generates electric charge when irradiated with said photostimulated luminescent light;
   acquisition means for obtaining said image signal in accordance with the quantity of said electric charge generated in said photoconductor; and
   suppression means for obtaining a signal, output from said solid-state image detector when scanning a non-image region other than an image recording region on said image recording sheet with said stimulating light, as a correction signal, and suppressing a non-image component, contained in a signal output from said solid-state image detector when scanning said image recording region with said stimulating light, with said correction signal.

12. The apparatus as set forth in claim 11, wherein said correction signal obtained by said suppression means is a signal obtained when scanning a vertical leading edge or trailing edge of said non-image region with said stimulating light.

13. The apparatus as set forth in claim 12, wherein the photoconductor of said solid-state image detector has amorphous selenium at its main component.

14. The apparatus as set forth in claim 11, wherein said correction signal obtained by said suppression means is a signal obtained when scanning a horizontal leading edge or trailing edge of said non-image region with said stimulating light.

15. The apparatus as set forth in claim 14, wherein the photoconductor of said solid-state image detector has amorphous selenium at its main component.

16. The apparatus as set forth in claim 11, wherein the photoconductor of said solid-state image detector has amorphous selenium at its main component.

17. A apparatus for obtaining an image signal, comprising:

scan means for scanning stimulating light in horizontal and vertical scanning directions on an image recording sheet having a stimulable phosphor layer which emits photostimulated luminescent light in a quantity corresponding to stored energy when irradiated with said stimulating light;

a solid-state image detector with a photoconductor which generates electric charge when irradiated with said photostimulated luminescent light;

acquisition means for obtaining said image signal in accordance with the quantity of said electric charge generated in said photoconductor;

control means for controlling an ON/OFF state of said stimulating light; and suppression means for obtaining a signal, output from said solid-state image detector when said stimulating light is in the OFF state, as a correction signal, and suppressing a non-image component, contained in a signal output from said solid-state image detector when scanning said image recording region with said stimulating light, with said correction signal.

18. The apparatus as set forth in claim 17, wherein the photoconductor of said solid-state image detector has amorphous selenium at its main component.

19. An apparatus for obtaining an image signal, comprising:

scan means for scanning stimulating light in horizontal and vertical scanning directions on an image recording sheet having a stimulable phosphor layer which emits photostimulated luminescent light in a quantity corresponding to stored energy when irradiated with said stimulating light;

a solid-state image detector with a photoconductor which generates electric charge when irradiated with said photostimulated luminescent light;

acquisition means for obtaining said image signal in accordance with the quantity of said electric charge generated in said photoconductor;

interception means for intercepting incidence of said stimulating light on said image recording sheet; and suppression means for obtaining a signal, output from said solid-state image detector when incidence of said stimulating light on said image recording sheet is intercepted by said interception means, as a correction signal, and suppressing a non-image component, contained in a signal output from said solid-state image detector when scanning said image recording region with said stimulating light, with said correction signal.

20. The apparatus as set forth in claim 19, wherein the photoconductor of said solid-state image detector has amorphous selenium at its main component.

* * * * *